Aug. 6, 1940.   R. H. RAMSEY   2,210,218
SOIL CONSERVATION APPARATUS
Filed Jan. 11, 1939   4 Sheets-Sheet 1
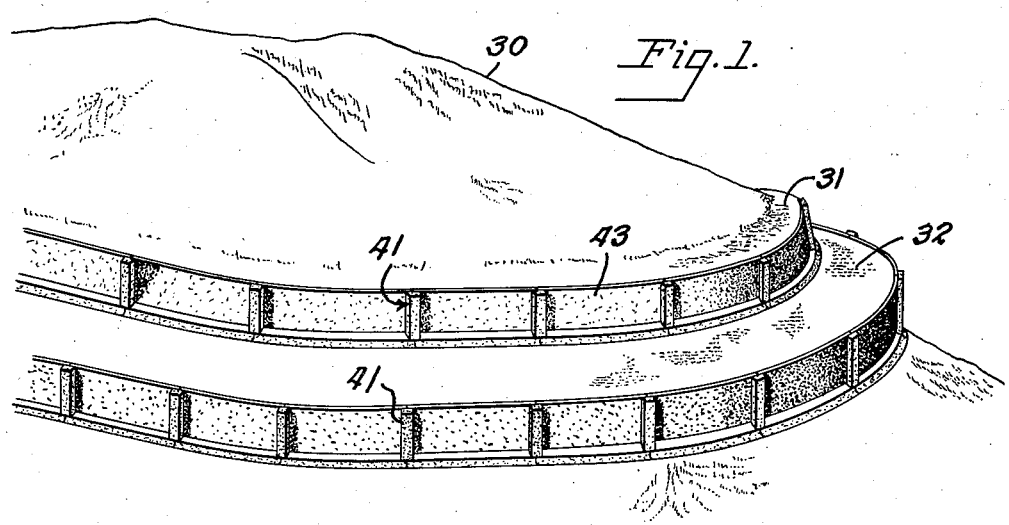
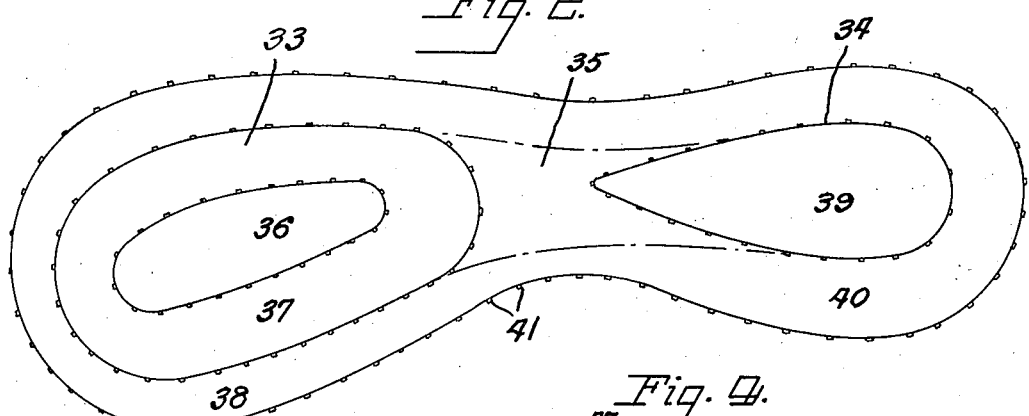
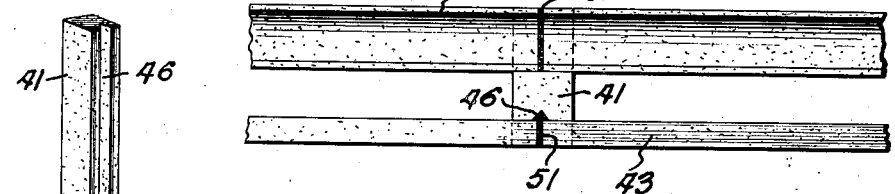
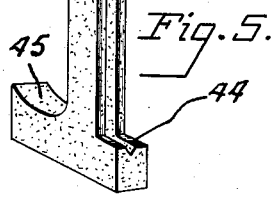
Inventor
Ralph H. Ramsey

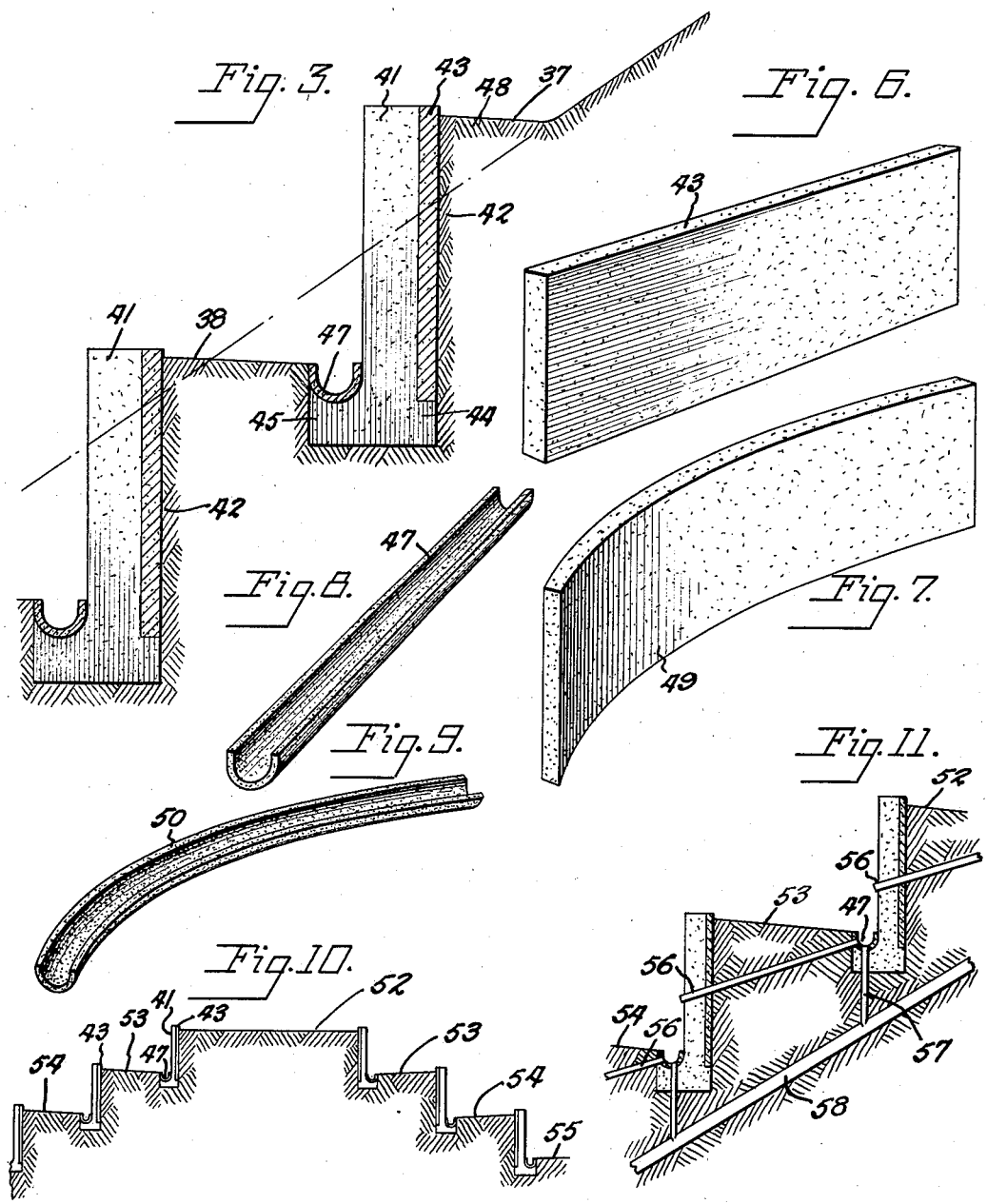

Aug. 6, 1940.     R. H. RAMSEY     2,210,218
SOIL CONSERVATION APPARATUS
Filed Jan. 11, 1939     4 Sheets-Sheet 3
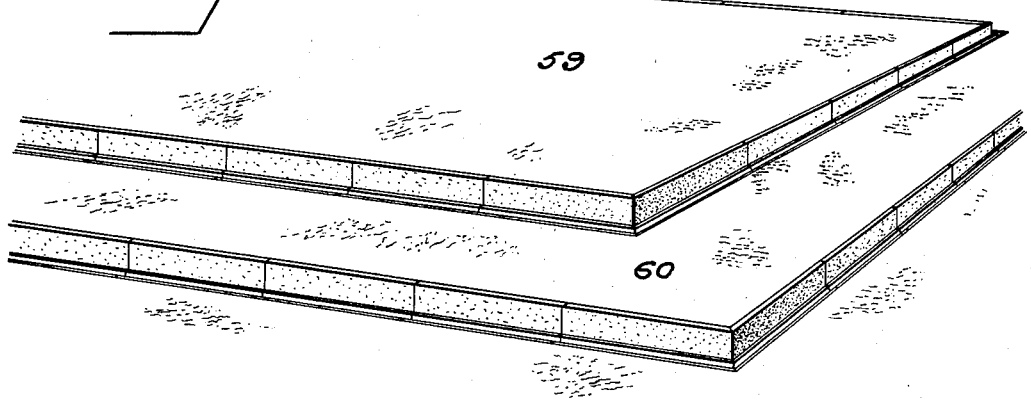
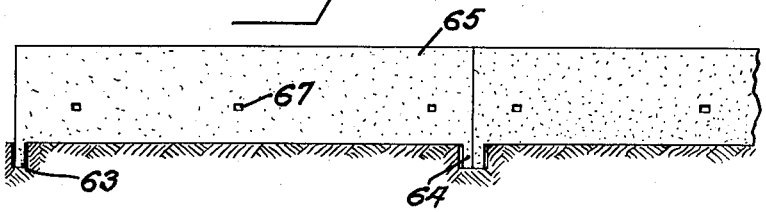
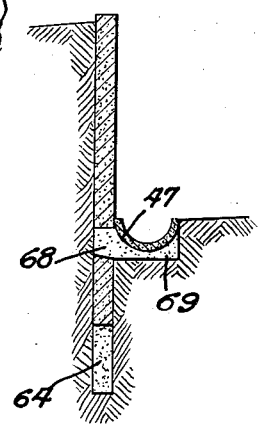
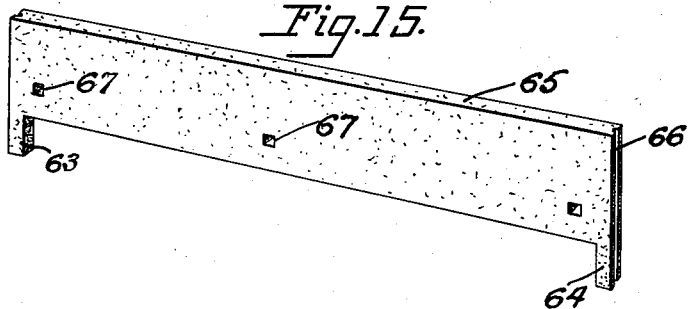
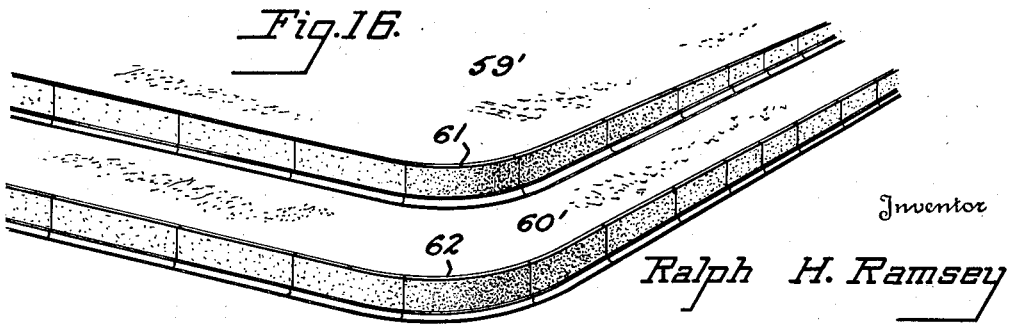
Inventor
Ralph H. Ramsey
By Mason Fenwick & Lawrence
Attorneys

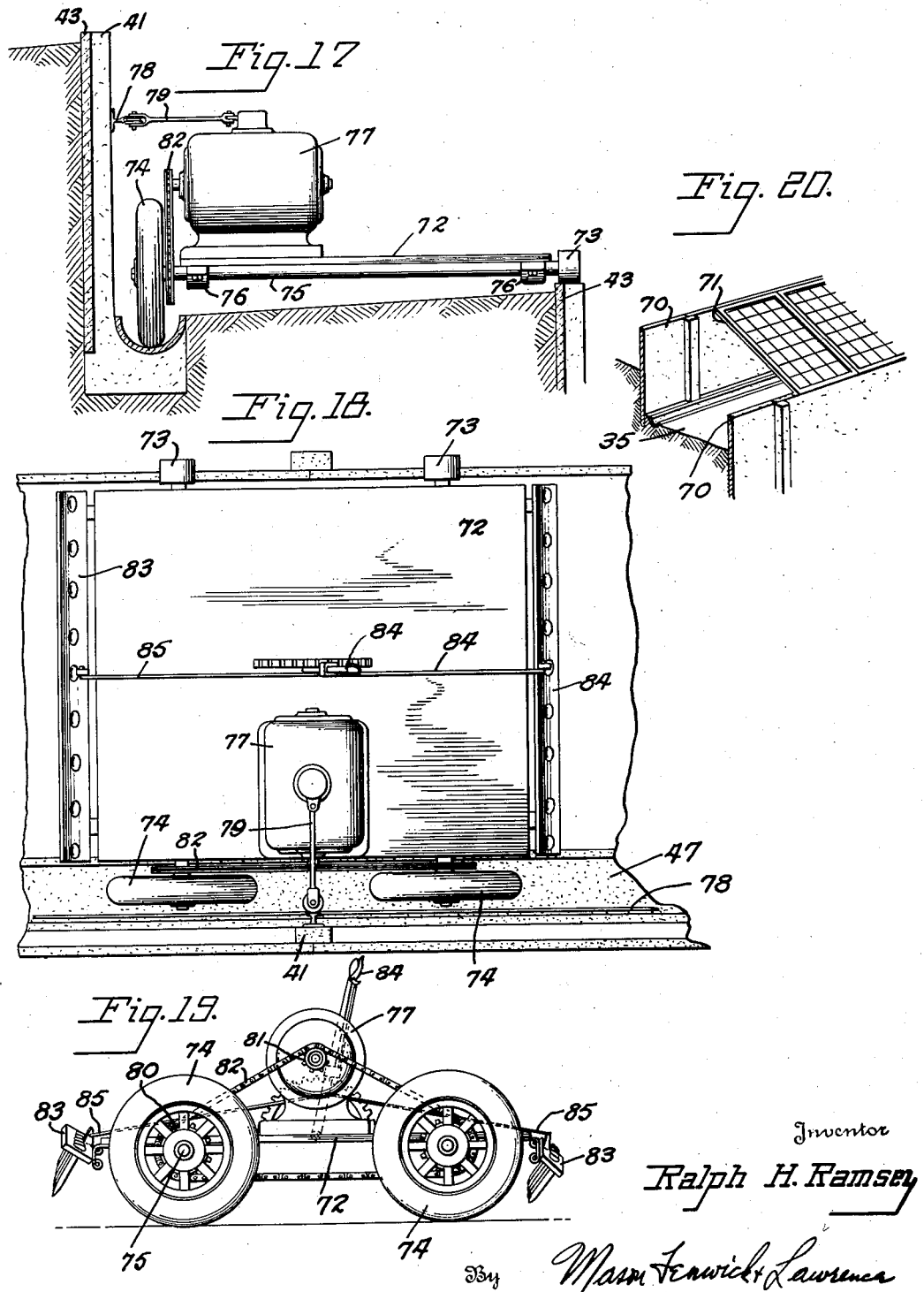

Patented Aug. 6, 1940

2,210,218

UNITED STATES PATENT OFFICE 2,210,218

SOIL CONSERVATION APPARATUS

Ralph Hamilton Ramsey, Springfield, Mo.

Application January 11, 1939, Serial No. 250,436

8 Claims. (Cl. 61—35)

This invention relates to a method and means of soil conservation and more particularly to a method whereby hilly, or normally unproductive ground, may be made available for cultivation.

Aside from the natural obstacles which arise in attempting to till the soil of a hillside farm, the soil itself on hilly ground is not readily adaptable to agriculture. Rain falling on hilly ground runs off rapidly instead of sinking into and saturating the ground, consequently, a short time after a rainfall, the ground rapidly becomes dry and parched. Rain water running down a hillside carries with it the top soil and valuable chemicals, leaving only barren sub-soil which is generally unfit for cultivation. Excess water running down from higher ground causes flooding of small streams and surrounding low areas, and also seriously erodes the surface areas. Heretofore, proper irrigation and cultivation of hilly ground has been found highly impractical and such ground areas have frequently become valueless.

One object of this invention is to provide a method for transforming normally unproductive hillside land into readily tillable areas. Another object is to provide a method of treating hilly ground to prevent erosion. A further object is to provide a method whereby hilly land will be self-irrigating and the natural gravitational seepage of water through the ground will be substantially enhanced. Another object is to provide means for cultivating ground which has been made available for cultivation purposes in accordance with the practice of the present invention. Other objects and advantages of this invention will become apparent from the following description taken in connection with the accompanying drawings.

In the drawings:

Figure 1 is a perspective view of a hill having a terrace formed thereon;

Figure 2 is a diagrammatic view showing the method of terracing adjoining hills;

Figure 3 is a section through a portion of a terraced hill;

Figure 4 is a plan view of a portion of a retaining wall and gutter illustrating abutting section thereof;

Figure 5 is a perspective of a supporting post;

Figure 6 is a perspective of one slab of the retaining wall;

Figure 7 is a perspective of a curved slab;

Figure 8 is a perspective of a section of gutter tile;

Figure 9 is a perspective of a section of curved gutter tile;

Figure 10 is a section through a completely terraced hill;

Figure 11 is a section showing a system of drain pipes;

Figure 12 is a perspective of a hill which has been formed into rectangular terraced fields;

Figure 13 is an elevation of a retaining wall to be used without supporting posts;

Figure 14 is a section through such a wall;

Figure 15 is a perspective of one of the slabs of the wall;

Figure 16 is a perspective of a hill formed as shown in Figure 12, employing rounded corner sections;

Figure 17 is an end elevation of a motorized cultivator shown in position on a terrace;

Figure 18 is a plan view thereof;

Figure 19 is a side elevation of the cultivator, and;

Figure 20 shows means to convert the terraces into hot houses.

Considering the drawings in greater detail, Figure 1 illustrates a hillside 30 which has been partially treated in accordance with the present invention to provide terraces or steps 31 and 32. Figure 2 illustrates a common ground formation comprising two hills 33 and 34 connected by an intermediate low area 35 altogether forming a ridge line, and in particular a saddle. The ridge line has portions lower than the peaks of the hills, but the entire ground formation being higher than the surrounding territory. In carrying out the method of the present invention, each of these hills are formed into a plurality of terraces 36, 37, 38, and 39 and 40 respectively. The tops of the hills are levelled off forming plateaus 36 and 39 and the lower terrace 38 and 40 continues on around both hills forming an enlarged area adapted to cultivation. It is advisable wherever possible to connect the adjoining hills and to make as many large area fields as possible.

To make the terraces V-shaped, cuts are made circumferentially around the hill and retaining walls are placed throughout these circumferentially extending grooves. Concrete posts 41 are erected at spaced intervals close to the vertical back wall 42 of the cleft and concrete slabs or panels 43 are set in, in back of the posts, with their adjacent edges in abutting relation to form a continuous wall structure around the terrace. The posts extend at substantially right angles to the terrace periphery and are provided with oppositely facing shoulders 44 and 45. The latter shoulders extend rearwardly from the lower end of the post and toward the vertical back walls of the cleft and the abutting edges of the slabs 43 rest upon the shoulder 44. A substantially V-shaped slot or groove 46 extends along one vertical face of the post and along the upper surface of the projection 44. After the slabs and posts are assembled, an appropriate binder 51 such as tar, cement or any other appropriate material is poured into the joint, providing a rigid and well secured continuous structure.

The lower portion 45 of the post projects forwardly to form a rest for the abutting edges of adjoining sections of a substantially U-shaped gutter 47. After the retaining wall is completed, the dirt which was taken out in cutting the cleft is thrown behind the wall as at 48 in Figure 3. The whole terrace is graded, providing a very gentle slope from a point slightly below the top of the front retaining wall downward to the gutter at the base of the back retaining wall. Such a graded terrace is indicated at 37 and 38 in Figure 3; it will be readily appreciated, however, that the relative dimensions of the portions of the retaining wall of the width of the terrace are not to be construed as proportional to similar dimensions on the ground since the figures of the drawings have been exaggerated for purposes of illustration. Such dimensions may vary in width depending entirely upon the steepness of the slope of the particular hillside.

It will be observed that the construction shown in Figures 1 and 2 follows the general contour of the hillside and, therefore, the terraces are determined by curved sections of wall as well as curved sections of gutter. In Figure 7, a curved wall section 49 (of concrete slabs) is shown. The curved gutter section 50 is illustrated in Figure 9.

Where the hill has been completely terraced, the resulting arrangement is illustrated more particularly in Figure 10 showing a section through the completely terraced hill with the upper terrace forming a flat plateau 52 of the annularly extending terraces 53, 54 and 55, the inner retaining wall 43 with the posts 41 and the gutter 47 defining the outer wall of the plateau 52 and the inner retaining wall for the terrace 53. A similar retaining wall 43' serves as the outer boundary wall for the terrace 53 and the inner retaining wall for the next lower terrace 54. The plateaus and terraces form basins or drainage areas for catching rainfall and effecting the controlled drainage throughout the area. In Figure 11, a more detailed arrangement is shown for controlling the water flow and providing for the transfer of excess water from one terrace to another on the one hand and for supplying water to the terraces where the small amount of rainfall is insufficient to properly supply the agricultural needs of the area. Due to the gradual slope of the terraces, most of the water will seep into the ground unless there is an extremely heavy rainfall, in which case the water that does not seep into the ground will flow gently into the gutters 47 and be carried off. This excess water may be carried off in either of two ways. It may flow by the over-flow pipes 56 leading from the gutter 47 of one terrace to a point above the gutter of the next lower terrace, or by means of the drain pipe 57 into the main drain pipe 58 and thence to any appropriate point. As a consequence of this arrangement, erosion of the soil will be practically eliminated and valuable chemicals in the soil will be retained for agricultural purposes and may be added to by the addition of proper fertilizers.

The gradual seepage of the water from the surface of the terrace 53 into the earth is arrested by the drawing action of the sun's rays and is brought back to the surface. The water which fell on the plateau 52 after its slow seepage into the soil may be partially restored to the soil surface of the plateau by action of the sun's rays and a portion thereof may be drawn to the surface of the terrace 53 as the result of the sun's rays acting on the water which has slowly seeped from the plateau surface toward the lower level of the terrace thereby securing the utmost benefit from a given amount of water and forming in effect a self-irrigating drainage system. If the normal rainfall over the area is too little to supply the needs, pumps can be operated to provide the necessary water flow upwardly in the main drain pipes 58, thereby allowing the pipes 57 to convey a proportionate amount of the water to each terrace level.

The invention is not limited to the details illustrated in Figures 1 to 11, inclusive, but variations may be utilized wherein the ground area is subject to a different arrangement of contouring. In Figures 12 and 16, the natural contour of the hill is not followed, but the plateaus and terraces are arranged more nearly in geometrical configuration. In Figure 12, the plateau 59 and the terrace 60 are substantially rectangular in shape. This arrangement requires more labor and, consequently, greater expense, but this provides fields which can be more readily cultivated. In Figure 16, the plateau 59' and terrace 60' are provided with rounded corners 61 and 62 for added ease in cultivation. The retaining wall in Figures 13, 14 and 15 is slightly different from that in Figure 1 wherein the supporting posts 41 are integral with the concrete retaining slabs in the form of depending legs 63 and 64. These legs or posts depend from the lower corners of the slabs 65 and are embedded in the earth. The abutting edges of the slabs 65 are provided with grooves 66 similar to the groove 46 in the post 41 and are arranged to receive tar, cement or other binding material for tying the slabs together. A series of holes 67 are formed in the slabs at intervals spaced from the lower edge and adapted to receive tapered ends 68 of concrete brackets or gutter supporting flanges 69 which latter support the gutter elements 47.

In Figure 20, the upper edge of the retaining walls 43 are extended as at 70 well above the surface 38 of an intermediate terrace and frames 71 are positioned on the upper edges thereof to transform the terraces into hot houses for raising produce out of season.

Referring to Figures 17 to 19, inclusive, an apparatus is shown which is particularly adapted to cultivate the soil of terraced hills. The device comprises a platform 72 supported upon wheels 73 and 74 located at the ends of transversely extending axles 75, the latter being supported beneath the platform by the bearings 76. The wheels 74 are traction wheels whereas the wheels 73 are of reduced diameter and are arranged to ride upon the edge of the retaining wall 43. Mounted upon the platform is a motor 77 receiving electric power from a trolley wire 78 by means of the trolley 79, the trolley wire being supported on the posts 41 at the inner retaining wall. The traction wheels 74 are driven by the sprocket wheels 80 secured to shafts 75 by means of the drive sprocket 81 and the continuous sprocket chain 82. At either end of the platform 72 is hingedly connected an agricultural implement 83 which latter are connected to a hand lever 84 by the links 85, thereby allowing the agricultural implements to be raised and lowered at will and also being so organized that the platform can move in either direction and have the appropriate agricultural implement lowered to till the soil.

This agricultural implement is designed particularly for use with terraces embodying features of the present invention and the traction wheels can run in the gutter 47, thereby guiding the machine around the terrace. The design produces a self-operating machine which will follow the gutter around the terrace and cultivate the soil without manual guiding.

Although a preferred embodiment of the invention is illustrated and described, it will be readily understood that variations within the true spirit and scope of the same are to be deetermined from the appended claims.

What I claim is:

1. The combination for soil conservation comprising a series of inwardly sloping terraces each of which slopes away from the natural slope of the ground, bounding walls at each side of the terrace with one bounding wall of each terrace serving as the retaining wall of the next higher terrace, a gutter along the lower edge of each terrace and supported on the retaining wall of the next higher terrace, a drainage conduit placing each gutter in communication with the next lower terrace above its respective gutter, and a common drainage conduit in communication with each gutter and arranged to carry off excess water from all the terraces and to supply water to each terrrace when the rainfall on the terraces is insufficient.

2. The combination for soil conservation comprising a series of inwardly sloping terraces, bounding walls at either side of the terrace, a gutter along one edge of each terrace, a drainage conduit placing each gutter in communication with the next lower terrace, a common drainage conduit in communication with each gutter and arranged to carry off excess water from each terrace and to supply water to each terrace when the rainfall on the terrace is insufficient, and soil treating agricultural means arranged to be supported upon said gutter and the outer retaining wall.

3. The combination for soil conservation comprising a series of inwardly sloping terraces, bounding walls at either side of the terrace, a gutter along one edge of each terrace, a drainage conduit placing each gutter in communication with the next lower terrace, a common drainage conduit in communication with each gutter and arranged to carry off excess water from each terrace and to supply water to each terrace when the rainfall on the terraces is insufficient, and a plurality of frames arranged to be supported upon the retaining walls to thereby transform the terraces into a series of elongated hot-houses without interfering with the water drainage and supply of said terraces.

4. Means for soil conservation and erosion control including a retaining wall comprising an upright series of slabs against a vertical ground surface with their adjacent edges in abutting relation, a series of gutter sections joined in continuous relation adjacent to and spaced from said wall slabs, and a plurality of spaced posts having lateral projections supporting said slabs and said gutters at the respective abutting edges thereof.

5. In combination erosion control wall construction of the post and panel type comprising posts having laterally projecting panel supporting and gutter supporting flanges, a series of panels with their abutting edges supported on the panel flanges, a series of elongated arcuate gutter sections supported upon said gutter flanges, and binding means tying said panels and gutters to the posts and flanges thereof.

6. In combination erosion control wall construction of the post and panel type comprising posts having laterally projecting panel supporting and gutter supporting flanges, a series of panels with their abutting edges supported on the panel flanges, a series of elongated arcuate gutter sections supported upon said gutter flanges, binding means tying said panels and gutters to the posts and flanges thereof, a similar wall spaced from the first wall by an intervening terrace, power means carried by said posts, soil treating agricultural devices arranged to be movably supported upon one wall and the gutter, and means energized by said power means for moving said device along said terrace.

7. An erosion control and soil conservation wall comprising panels having wall supporting posts extending from the ends thereof, grooves extending along abutting portions of adjacent panel and post faces, gutter sections arranged to be substantially coextensive with said wall, and gutter supporting means extending laterally from said wall panels and having arcuate gutter holding portions.

8. An erosion control and soil conservation wall comprising panels having wall supporting posts extending from the ends thereof, and a series of tapered openings extending transversely through said panels, grooves extending along abutting portions of adjacent panel and post faces, gutter sections arranged to be combinedly substantially coextensive with said wall, and gutter supporting means having a tapered portion seating in said openings and extending laterally from said wall panels.

RALPH HAMILTON RAMSEY.